(No Model.)

F. H. SMITH.
EGG SEPARATOR.

No. 575,811. Patented Jan. 26, 1897.

Witnesses
Inventor
F. H. Smith.
By his Attorney

UNITED STATES PATENT OFFICE.

FREDERICK H. SMITH, OF DENVER, COLORADO, ASSIGNOR OF ONE-HALF TO DOUGLAS D. MERRITT, OF SAME PLACE.

EGG-SEPARATOR.

SPECIFICATION forming part of Letters Patent No. 575,811, dated January 26, 1897.

Application filed April 6, 1896. Serial No. 586,389. (No model.)

*To all whom it may concern:*

Be it known that I, FREDERICK H. SMITH, a citizen of the United States of America, residing at Denver, in the county of Arapahoe and State of Colorado, have invented certain new and useful Improvements in Egg-Separators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in egg-separators, or devices for separating the white from the yolk of the egg, and my object is to provide a device of this class which shall be simple in construction, economical in cost, reliable, durable, and efficient in use; and to these ends the invention consists of the features hereinafter described and claimed, all of which will be fully understood by reference to the accompanying drawings, in which is illustrated an embodiment thereof.

Figure 1:
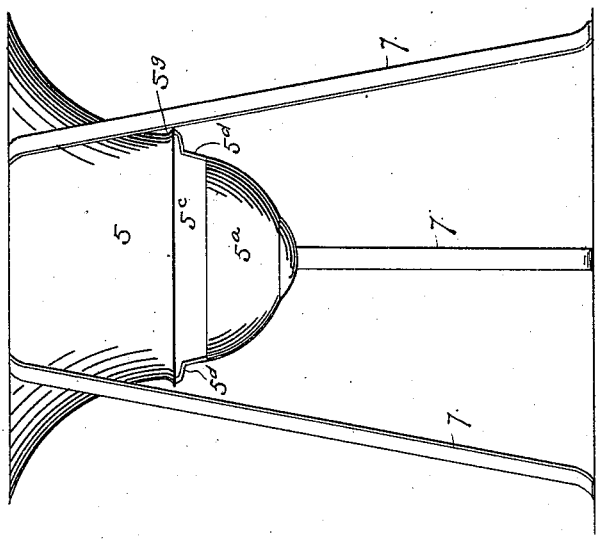
Figure 2:
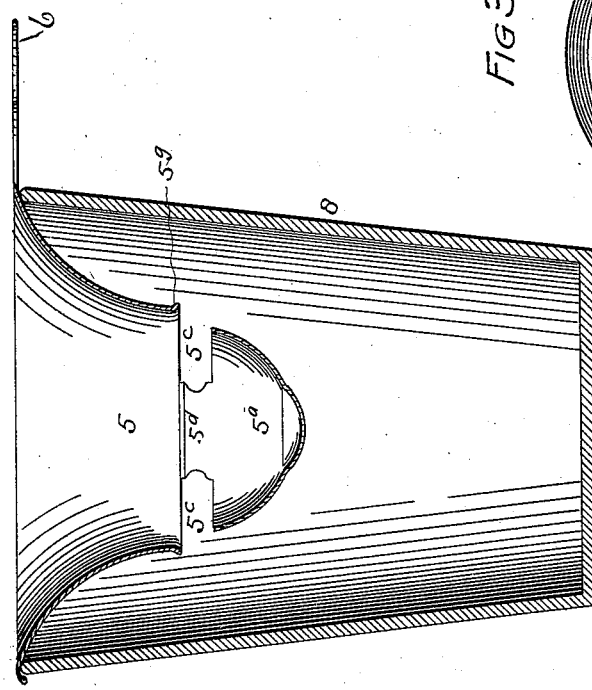
Figure 3:
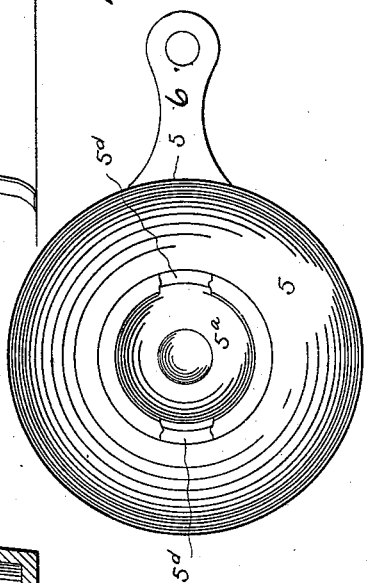

In the drawings, Figure 1 illustrates the device mounted upon legs. Fig. 2 is a section taken through the device set into a glass or tumbler. Fig. 3 is a top view of the device.

Similar reference-characters indicate corresponding parts in the views.

Let the numeral 5 designate a receptacle of suitable shape, whose lower portion $5^a$ forms a cell adapted to receive the yolk of the egg. Between this cell and the body of the receptacle one or more discharge-slots $5^c$ are formed. It is preferred to form two slots, located one on each side of the receptacle and extending nearly around the same, leaving only sufficient material between the slots to form a suitable connection between the upper and lower parts of the device.

Between the cell $5^a$ and the upper part of the device is preferably formed a horizontal offset, whereby when the material is cut away to form the slot the latter becomes an opening of considerable width in a horizontal plane.

The device is preferably formed bell shape, and is adapted to set into a glass or tumbler 8, as shown in Fig. 2.

In use the eggs are broken into the receptacle one at a time. The yolk, which is heavier, settles into the cell $5^a$ in the bottom of the receptacle, while the white portion, which is of less specific gravity, remains above and flows out of the receptacle through the slots $5^c$ into the glass. Hence the advantage of the offset at the top of the part $5^a$, whereby an opening of considerable horizontal width is formed. It is found in practice that the white portion of the egg runs quickly out into the glass or cup into which the device is set. The yolk is removed by tipping it out of the top of the receptacle.

For convenience in handling and hanging up the device it is provided with an apertured handle 6.

If desired, the receptacle may be provided with supporting-legs 7, as shown in Fig. 1. When thus formed, it may be set upon any flat surface and used.

The edge of the device above the slots $5^c$ is turned slightly outward, as shown at $5^g$, to further facilitate the escape of the white portion of the egg.

Having thus described my invention, what I claim is—

As an improved article of manufacture the egg-separator herein described comprising a receptacle 5, having a cell $5^a$ in its bottom and one or more slots $5^c$ formed between the cell and the upper part of the device, said slot or slots extending nearly around the device, the separator being so shaped that the diameter of the device measured across the lower edge of the slots is considerably less than when measured at the upper edge of the slots, whereby the latter have considerable width in a horizontal plane, the lower edge of the slots being straight and the upper edge being bent outwardly to facilitate the escape of the white portion of the egg substantially as described.

In testimony whereof I affix my signature in the presence of two witnesses.

FREDERICK H. SMITH.

Witnesses:
   A. J. O'BRIEN,
   D. D. MERRITT.